Aug. 12, 1924.  1,504,645

J. A. RICE

METHOD OF MANUFACTURING FORMS OF CEMENT

Filed May 1, 1923

INVENTOR.
J. A. Rice
BY

ATTORNEYS.

Patented Aug. 12, 1924.

1,504,645

UNITED STATES PATENT OFFICE.

JOHN A. RICE, OF BERKELEY, CALIFORNIA.

METHOD FOR MANUFACTURING FORMS OF CEMENT.

Application filed May 1, 1923. Serial No. 636,031.

*To all whom it may concern:*

Be it known that I, JOHN A. RICE, a citizen of the United States, and a resident of Berkeley, county of Alameda, State of California, have invented a new and useful Method for Manufacturing Forms of Cement, of which the following is a specification.

The present invention relates to improvements in methods for producing cement slabs in various forms. It is a method particularly adapted to be used in connection with my cellular cement described in my co-pending application, Serial No. 608,349. This form of cement differs from ordinary cement now commonly used in the fact that due to its cellular structure it is adapted to be sawed or cut very much in the same manner as wood even after the cement has been hardened. Due to this characteristic my cellular cement lends itself readily to the manufacture of various kinds of forms, such as boards, planks, bricks, blocks, shingles, tiles, scantlings, and so on. My process is furthermore adapted to allow reinforcing elements to be introduced into the forms and to thus produce an article adapted to take the place of wood or lumber in many instances, and of such construction as to be practically indestructible.

Figure 1:
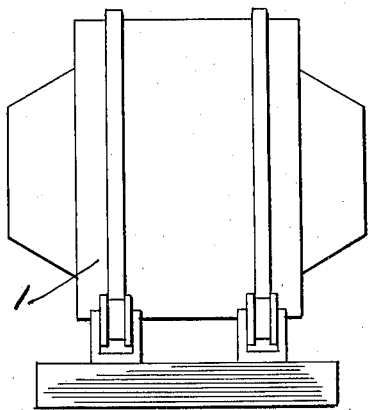
Figure 2:
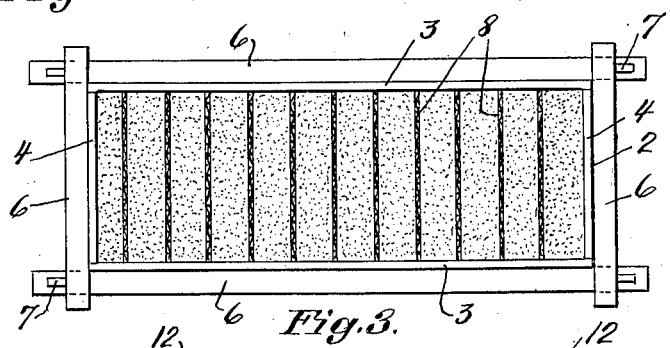
Figure 3:
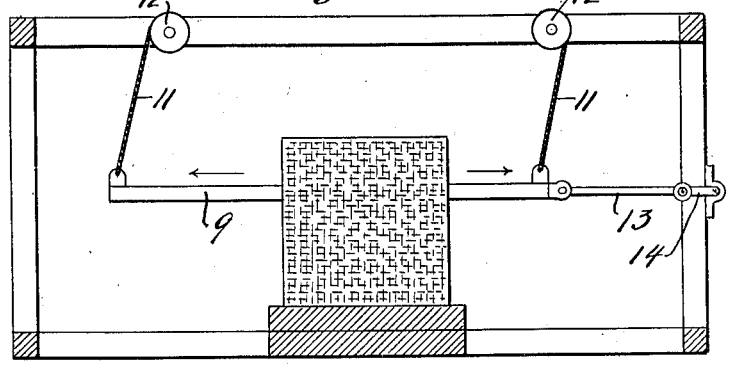
Figure 4:
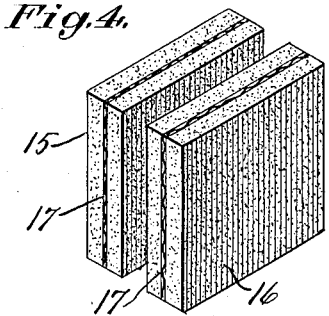
Figure 4:
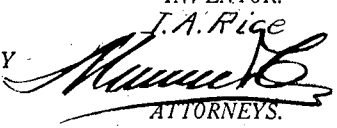

The preferred form in which my method may be carried out is illustrated in the accompanying drawing in which Figure 1 shows a side view of a mixer for my cement, Figure 2 a plan view of a block of cement prepared according to my method, Figure 3 a view illustrating the manner of slicing the said block into a plurality of forms, and Figure 4 a perspective view of two forms forming the final product of my process. While I have illustrated only the preferred form of the invention, it should be understood that various changes may be made in the different steps forming part of my invention without departing from the spirit of the same.

In carrying out my method I first mix cement and a suitable foam in the manner described in my co-pending application Serial No. 608,349 and further improved in my co-pending application Serial No. 634,370 in any suitable mixer such as that shown at (1) in Figure 1. The foam referred to therein is made by beating up a gel-like mass, generally a colloid and I prefer to use a glue solution to which a mixture consisting of resin dissolved in acetone or alcohol to which sufficient formalin has been added to cause the resin to disperse in the form of a very fine precipitate when added to an aqueous liquid. After the cement and sand has been properly impregnated with the foam in the presence of water, it is ready to be poured into the mold (2) illustrated in Figure 2. The latter consists of preferably two sides (3) and two end pieces (4) held together so as to form a rectangular block by means of scantlings (6). The latter are preferably joined in such a manner that they may be easily separated. For this purpose the two side scantlings may be provided with perforations (7) adapted to receive suitable keys, while the end scantlings are slotted to slip over the ends of the side scantlings so that they may be held in place by the keys previously mentioned.

The mold may be of any suitable size and should be sufficiently large to allow a large plurality of forms to be cut out of the block of cement formed in the mold. If we assume that forms are to be cut 2 feet wide and 4 feet deep and 1 inch thick the mold should be made 2 feet wide, 4 feet deep and perhaps 20 feet long, which would allow 20 x 12 or 240 forms to be cut out of the block. A plurality of reinforcing elements such as the wire netting (8) are stretched across the mold at suitable distances from one another and fastened in any suitable manner. If the forms are to be 1 inch thick the reinforcing elements should be spaced a little more than 1 inch apart to allow for the part cut away by the saw or other instrument used for slicing the cement. After these reinforcing elements have been arranged the soft cement is poured into the mold and allowed to set, preferably until it reaches a cheese-like consistency. The scantlings (6) are then removed and the side and end boards of the mold separated from the block, whereupon the slicing of the same may begin. The slicing may be done in many different ways, as for instance by means of the tool shown in Figure 3 presenting a cutting blade (9) suspended by means of cords (11) from two rolls (12) and adapted to be reciprocated by means of a connecting link (13) actuated by a crank shaft (14). Many different ways of slicing the block of cement may be found, and an ordinary saw will give satisfactory results. The slicing of course is preferably done along lines lying midway between two reinforcing elements so that the latter are embedded in the center of the forms. The final product is illustrated in Figure 4, in which the two forms (15) and (16) are shown as rectangular blocks provided with central reinforcing elements (17).

I claim:

1. The method of making cement forms which consists in filling a mold with soft cement prepared to yield to cutting action when hardened, in allowing the cement to partly set and in then slicing the same.

2. The method of making cement forms which consists in filling a mold with soft cellular cement, in allowing the cement to partly set and in then slicing the same.

3. The method of making reinforced cement forms which consists in stretching reinforcing elements across a mold, in filling the mold with soft cement prepared to yield to cutting action when hardened, in allowing the cement to partly set and then slicing the same into layers having the reinforcing members embedded therein.

4. The method of making reinforced cement forms which consists in stretching reinforcing elements across a mold, in filling the mold with soft cellular cement, in allowing the cement to partly set and in then slicing the same into layers having the reinforcing members embedded therein.

5. The method of making cement forms which comprises molding material adapted to set into a porous mass, allowing the same to set and then slicing the same.

6. The method of making cement forms which comprises molding material adapted to set into a porous mass, allowing the same to partly set and then slicing the same.

7. The method of making reinforced cement forms which consists in stretching reinforcing members across the mold, filling the mold with cement adapted to set into a porous mass, allowing the same to set, and then slicing the same in layers having the reinforcing members embedded therein.

8. The method of making reinforced cement forms which consists in stretching reinforcing members across the mold, filling the mold with cement adapted to set into a porous mass, allowing the same to partly set, and then slicing the same in layers having the reinforcing members embedded therein.

JOHN A. RICE.